(12) United States Patent
Duchaj et al.

(10) Patent No.: US 9,307,183 B1
(45) Date of Patent: Apr. 5, 2016

(54) PORTABLE IMAGE PROJECTOR ASSEMBLY

(71) Applicants: Mike J. Duchaj, Dallas, GA (US);
Melissa G. Duchaj, Dallas, GA (US)

(72) Inventors: Mike J. Duchaj, Dallas, GA (US);
Melissa G. Duchaj, Dallas, GA (US)

( * ) Notice: Subject to any disclaimer, the term of this patent is extended or adjusted under 35 U.S.C. 154(b) by 143 days.

(21) Appl. No.: 14/151,897

(22) Filed: Jan. 10, 2014

(51) Int. Cl.
*G03B 21/14* (2006.01)
*H04N 5/74* (2006.01)

(52) U.S. Cl.
CPC .................................. *H04N 5/7475* (2013.01)

(58) Field of Classification Search
CPC ............ H04N 5/2256; H04N 1/00981; H04N 9/3176; H04N 2101/00; H04N 1/00283; H04N 5/7475; G03B 21/16; G03B 17/54
See application file for complete search history.

(56) References Cited

U.S. PATENT DOCUMENTS

| 4,684,349 A | 8/1987 | Ferguson et al. |
| 6,626,543 B2 | 9/2003 | Derryberry |
| 6,884,076 B2 | 4/2005 | Clark et al. |
| 7,052,136 B2 | 5/2006 | Johnson |
| 7,563,099 B1 | 7/2009 | Iftikhar |
| D648,769 S | 11/2011 | Tzeng |
| 2005/0083486 A1* | 4/2005 | Johnson .......................... 353/15 |
| 2005/0280786 A1 | 12/2005 | Moiroux et al. |
| 2009/0027570 A1* | 1/2009 | Fujinawa ...................... 348/744 |
| 2011/0001983 A1* | 1/2011 | Becker et al. .................. 356/610 |

FOREIGN PATENT DOCUMENTS

| JP | 2006092089 | 4/2006 |
| JP | 2011176643 | 9/2011 |

* cited by examiner

*Primary Examiner* — Sultan Chowdhury
*Assistant Examiner* — Danell L Owens

(57) ABSTRACT

A portable image projector assembly electronically stores educational material and projects it onto a wall or ceiling surface. The assembly includes a portable housing. A projector is coupled to the housing. The projector includes a lens. A processor is mounted in the housing. The processor is electrically coupled to the projector. An electronic memory is electrically coupled to the processor for storing visual data. The processor accesses the visual data and visually projects the visual data through the lens when the processor is actuated wherein the lens is configured to project the visual data onto an external surface.

17 Claims, 3 Drawing Sheets

PORTABLE IMAGE PROJECTOR ASSEMBLY

BACKGROUND OF THE DISCLOSURE

Field of the Disclosure

The disclosure relates to image projectors and more particularly pertains to a new image projector for electronically storing educational material and projecting it onto a wall or ceiling surface.

SUMMARY OF THE DISCLOSURE

An embodiment of the disclosure meets the needs presented above by generally comprising a portable housing. A projector is coupled to the housing. The projector includes a lens. A processor is mounted in the housing. The processor is electrically coupled to the projector. An electronic memory is electrically coupled to the processor for storing visual data. The processor accesses the visual data and visually projects the visual data through the lens when the processor is actuated wherein the lens is configured to project the visual data onto an external surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
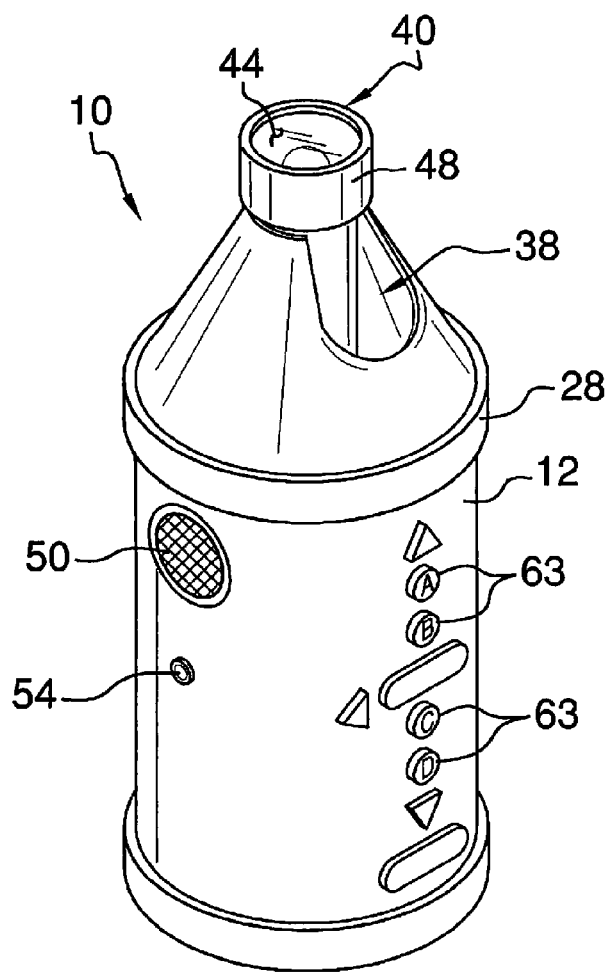
FIG. 1 is a top front side perspective view of a portable image projector assembly according to an embodiment of the disclosure.
Figure 2:
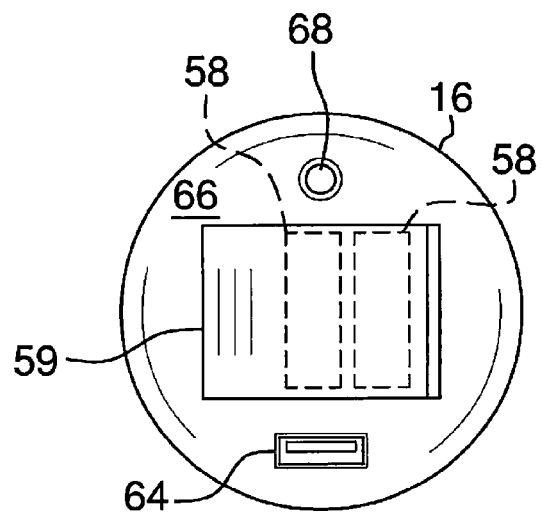
FIG. 2 is a bottom view of an embodiment of the disclosure.
Figure 3:
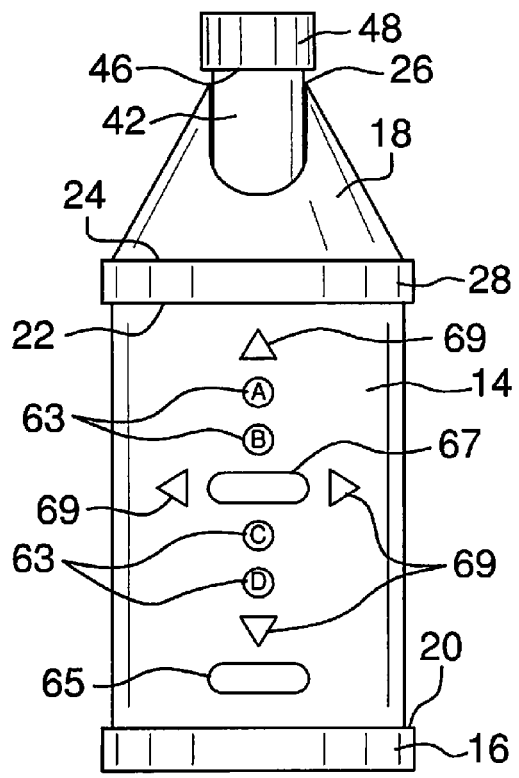
FIG. 3 is a front view of an embodiment of the disclosure.
Figure 4:
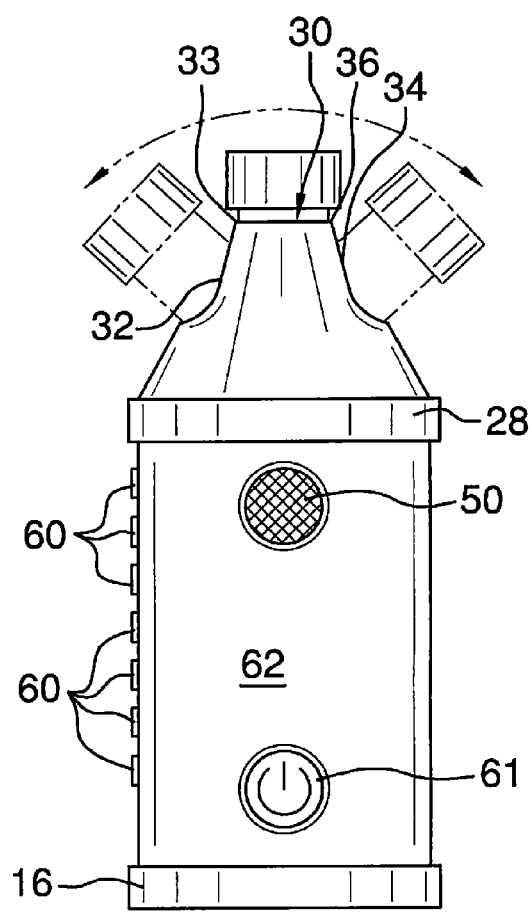
FIG. 4 is a side view of an embodiment of the disclosure.
Figure 5:
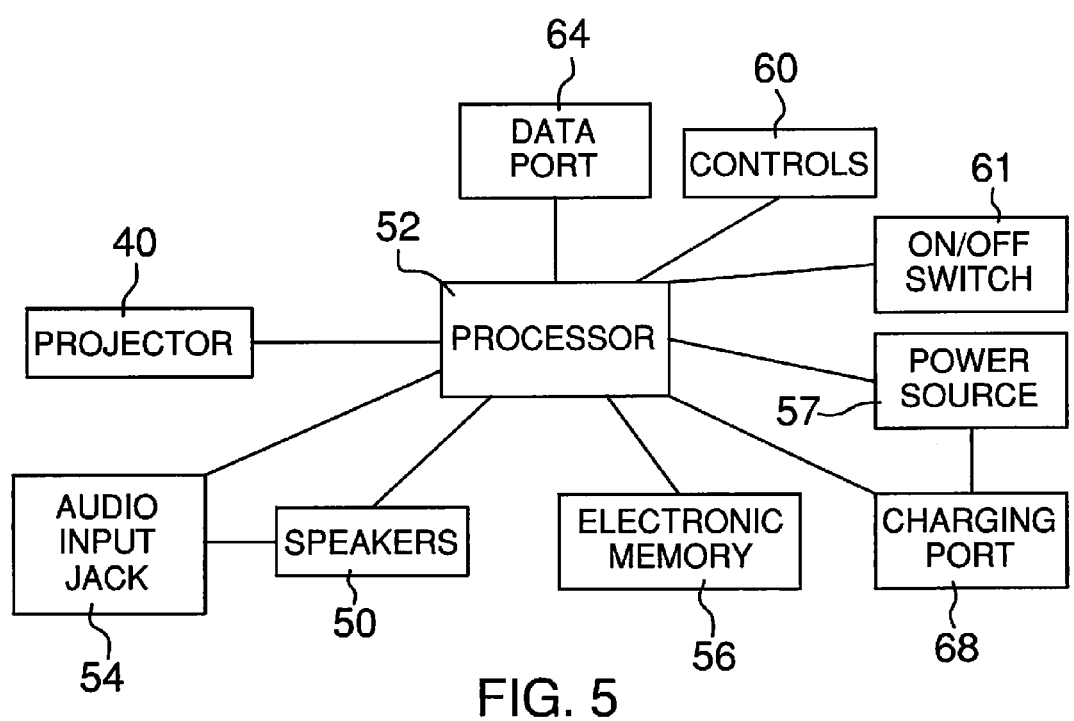
FIG. 5 is a schematic view of an embodiment of the disclosure.

With reference now to the drawings, and in particular to FIGS. 1 through 5 thereof, a new image projector embodying the principles and concepts of an embodiment of the disclosure and generally designated by the reference numeral 10 will be described.

As best illustrated in FIGS. 1 through 5, the portable image projector assembly 10 generally comprises a portable housing 12 including a main portion 14, a base portion 16 and an upper portion 18. The main portion 14 is attached to a top 20 of the base portion 16. The upper portion 18 is attached to a top 22 of the main portion 14. The main portion 14 may be cylindrical. The upper portion 18 may taper upwardly and inwardly from a bottom 24 of the upper portion 18 to a top 26 of the upper portion 18. An outwardly projecting lip 28 is coupled to and positioned between the upper portion 18 and the main portion 14 of the housing 12.

An aperture 30 is positioned in the upper portion 18 of the housing 12 and in particular may be positioned the top 26 of the upper portion 18. A first arcuate notch 32 extends into the upper portion 18 of the housing 12. The first arcuate notch 32 extends outwardly from a first side 33 of the aperture 30. A second arcuate notch 34 extends into the upper portion 18. The second arcuate notch 34 extends outwardly from a second side 36 of the aperture 30. Each of the aperture 30, the first arcuate notch 32 and the second arcuate notch 34 is coextensive with respect to each other such that the aperture 30, the first arcuate notch 32 and the second arcuate notch 34 define a unitary void 38 extending into the upper portion 18 of the housing 12.

A generally conventional projector 40 is provided. The projector 40 has a shaft 42 extending into the aperture 30 and a lens 44 coupled to a distal end 46 of the shaft 42 with respect to the housing 12. The lens 44 projects outwardly of the aperture 30. The projector 40 includes a lens adjustment mechanism 48 for selectively controlling an amount of light that passes through the lens 44. The projector 40 is selectively pivotable within the void 38 such that the lens 44 is positionable at a selectable angle relative to the housing 12.

At least one speaker 50 is coupled to the housing 12. A processor 52 is mounted in the housing 12. The processor 52 is electrically coupled to the projector 40 and each speaker 50. An audio input jack 54 is coupled to the housing 12. The audio input jack 54 is operationally coupled to each speaker 50 either directly or through the processor 52. An electronic memory 56 is electrically coupled to the processor 52 for storing audio data and visual data, and in particular may store games of an educational nature. The processor 52 accesses the audio data and audibly projects the audio data with each speaker 50 when the processor 52 is actuated. The processor 52 accesses the visual data and visually projects the visual data through the lens 44 when the processor 52 is actuated wherein the lens 44 is configured to project the visual data onto an external surface, such as a wall, ceiling or the like.

A power source 57 is coupled to the housing 12. The power source 57 is electrically coupled to processor 52 for providing power to the processor 52. The power source 57 may comprise at least one rechargeable battery 58 positioned in a compartment 59 of the housing 12. An on/off switch 61 is operationally coupled to the processor 52 for selectively activating the processor 52. A plurality of controls 60 is provided. Each of the controls 60 is electrically coupled to the processor 52. Each of the controls 60 may be positioned on an exterior 62 of the housing 12. Each of the controls 60 is operationally coupled to the processor 52 wherein manipulation of each of the controls 60 selectively controls accessing of the audio data and visual data by the processor 52. The controls 60 may include multiple choice answer buttons 63 to allow a user to answer multiple choice-type educational questions that are projected through the lens 44. The controls 60 may also include a menu button 65, an enter button 67, and directional control buttons 69, such as an up arrow, a down arrow, a left arrow and a right arrow.

A data port 64 is coupled to the housing 12. The data port 64 is operationally coupled to the processor 52 for transmitting data between the processor 52 and an extrinsic device operationally coupled to the data port 64. This will allow a user to transmit additional games or like information to the processor 52 so that a user can access the information through the assembly 10. The data port 64 may extend into a bottom 66 of the base portion 16 of the housing 12. Data may also be transmitted between the processor 52 and an extrinsic device through wireless technology. A charging port 68 is coupled to the housing 12. The charging port 68 is operationally coupled to the power source 54 for recharging the power source 54 when an external power cord is operationally coupled to the charging port 68. Alternatively, the charging port 68 may be electrically coupled to the processor 52 for providing power to the processor 52 without using the power source 57.

In use, as stated above and shown in the Figures, the on/off switch 61 is selectively manipulated to activate the processor 52. The lens 44 is pivoted within the void 38 to position the lens 44 at a selectable angle relative to the housing 12. Manipulation of selectable ones of the controls 60 causes audio data to be selectively played through each speaker 50 and visual data to be selectively projected through the lens 44 so that the visual data can be displayed on an external surface. The audio and visual data can be loaded onto the assembly 10 through the data port 64.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A portable image projector assembly comprising:
a portable housing, said housing includes a main portion and an upper portion attached to a top of said main portion;
a projector coupled to said housing, said projector including a lens;
a processor being mounted in said housing, said processor being electrically coupled to said projector; and
an electronic memory being electrically coupled to said processor for storing visual data, said processor accessing the visual data and visually projecting the visual data through said lens when said processor is actuated wherein said lens is configured to project the visual data onto an external surface;
an aperture positioned in a top of said upper portion of said housing, said projector having a shaft extending into said aperture, said lens being coupled to a distal end of said shaft with respect to said housing, said lens projecting outwardly of said aperture;
a first arcuate notch extending into said upper portion of said housing, said first arcuate notch extending outwardly from a first side of said aperture; and
wherein said projector is selectively pivotable between said aperture and said first arcuate notch.

2. The assembly of claim 1, further comprising said upper portion tapering upwardly and inwardly from a bottom of said upper portion to a top of said upper portion.

3. The assembly of claim 1, further comprising said main portion being cylindrical.

4. The assembly of claim 1, wherein said housing further includes a base portion, said main portion being attached to a top of said base portion.

5. The assembly of claim 1, further comprising an outwardly projecting lip coupled to and positioned between said upper portion and said main portion of said housing.

6. The assembly of claim 1, further comprising:
a second arcuate notch extending into said upper portion, said second arcuate notch extending outwardly from a second side of said aperture;
wherein each of said aperture, said first arcuate notch and said second arcuate notch is coextensive with respect to each other such that said aperture, said first arcuate notch and said second arcuate notch define a unitary void extending into said upper portion of said housing; and
wherein said projector is selectively pivotable within said void such that said lens is positionable at a selectable angle relative to said housing.

7. The assembly of claim 1, further comprising a speaker being coupled to said housing, said processor being electrically coupled to said speaker.

8. The assembly of claim 7, further comprising said speaker being one of a plurality of said speakers.

9. The assembly of claim 7, further comprising said electronic memory storing audio data thereon, said processor accessing the audio data and audibly projecting the audio data with said speaker when said processor is actuated.

10. The assembly of claim 1, further comprising a power source coupled to said housing, said power source being electrically coupled to processor for providing power to said processor.

11. The assembly of claim 10, further comprising wherein said power source comprises at least one battery positioned in a compartment of said housing.

12. The assembly of claim 1, further comprising an on/off switch operationally coupled to said processor for selectively activating said processor.

13. The assembly of claim 9, further comprising a plurality of controls, each of said controls being electrically coupled to said processor, each of said controls being operationally coupled to said processor wherein manipulation of each of said controls selectively controls accessing of the audio data and visual data by said processor.

14. The assembly of claim 1, further comprising a data port coupled to said housing, said data port being operationally coupled to said processor for transmitting data between said processor and an extrinsic device operationally coupled to said data port.

15. The assembly of claim 4, further comprising said data port extending into a bottom of said base portion of said housing.

16. The assembly of claim 10, further comprising a charging port coupled to said housing, said charging port being operationally coupled to said power source for recharging said power source when an external power cord is operationally coupled to said charging port.

17. A portable image projector assembly comprising:
a portable housing including a main portion, a base portion and an upper portion, said main portion being attached to a top of said base portion, said upper portion being attached to a top of said main portion, said main portion being cylindrical, said upper portion tapering upwardly and inwardly from a bottom of said upper portion to a top of said upper portion;
an outwardly projecting lip coupled to and positioned between said upper portion and said main portion of said housing;

an aperture positioned in said top of said upper portion of said housing;

a first arcuate notch extending into said upper portion of said housing, said first arcuate notch extending outwardly from a first side of said aperture;

a second arcuate notch extending into said upper portion, said second arcuate notch extending outwardly from a second side of said aperture;

wherein each of said aperture, said first arcuate notch and said second arcuate notch is coextensive with respect to each other such that said aperture, said first arcuate notch and said second arcuate notch define a unitary void extending into said upper portion of said housing;

a projector, said projector having a shaft extending into said aperture and a lens coupled to a distal end of said shaft with respect to said housing, said lens projecting outwardly of said aperture, said projector including a lens adjustment mechanism for selectively controlling an amount of light that passes through said lens, said projector being selectively pivotable within said void such that said lens is positionable at a selectable angle relative to said housing;

a plurality of speakers being coupled to said housing;

a processor being mounted in said housing, said processor being electrically coupled to said projector and each said speaker;

an electronic memory being electrically coupled to said processor for storing audio data and visual data, said processor accessing the audio data and audibly projecting the audio data with each said speaker when said processor is actuated, said processor accessing the visual data and visually projecting the visual data through said lens when said processor is actuated wherein said lens is configured to project the visual data onto an external surface;

a power source coupled to said housing, said power source being electrically coupled to processor for providing power to said processor, said power source comprising a battery positioned in a compartment of said housing;

an audio input jack coupled to said housing, said audio input jack being operationally coupled to each said speaker;

an on/off switch operationally coupled to said processor for selectively activating said processor;

a plurality of controls, each of said controls being electrically coupled to said processor, each of said controls being positioned on an exterior of said housing, each of said controls being operationally coupled to said processor wherein manipulation of each of said controls selectively controls accessing of the audio data and visual data by said processor;

a data port coupled to said housing, said data port being operationally coupled to said processor for transmitting data between said processor and an extrinsic device operationally coupled to said data port, said data port extending into a bottom of said base portion of said housing; and a charging port coupled to said housing, said charging port being operationally coupled to said power source for recharging said power source when an external power cord is operationally coupled to said charging port.

* * * * *